C. F. CURREY.
WINDMILL.
APPLICATION FILED MAY 16, 1919.
1,341,045.
Patented May 25, 1920.
2 SHEETS—SHEET 1.
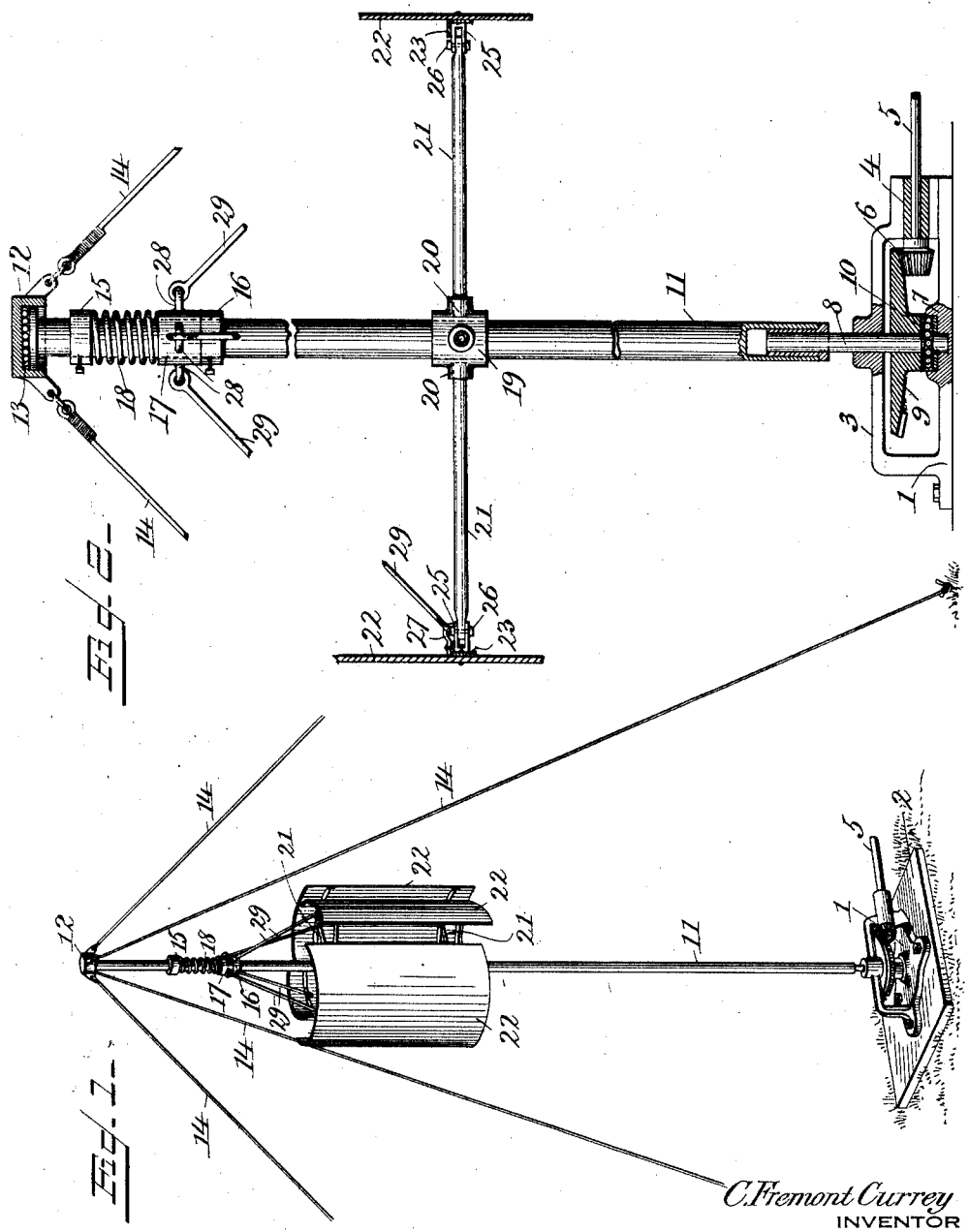
C. Fremont Currey
INVENTOR
WITNESSES
BY
ATTORNEY C. F. CURREY.
WINDMILL.
APPLICATION FILED MAY 16, 1919.
1,341,045.
Patented May 25, 1920.
2 SHEETS—SHEET 2.
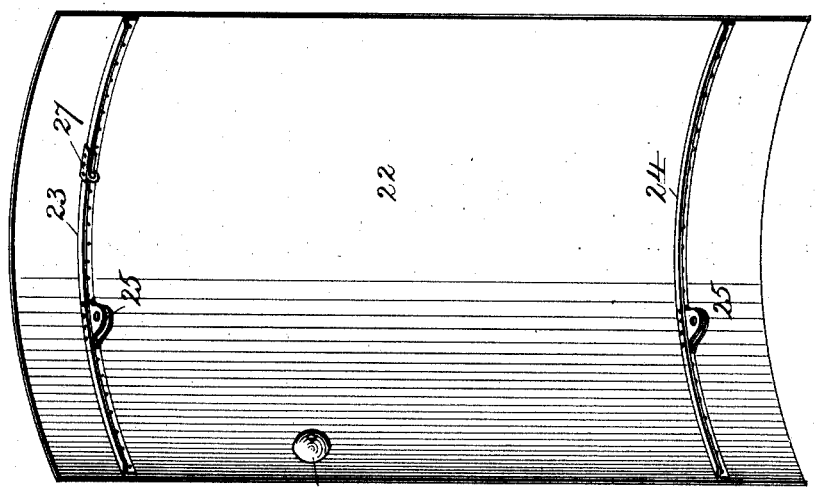
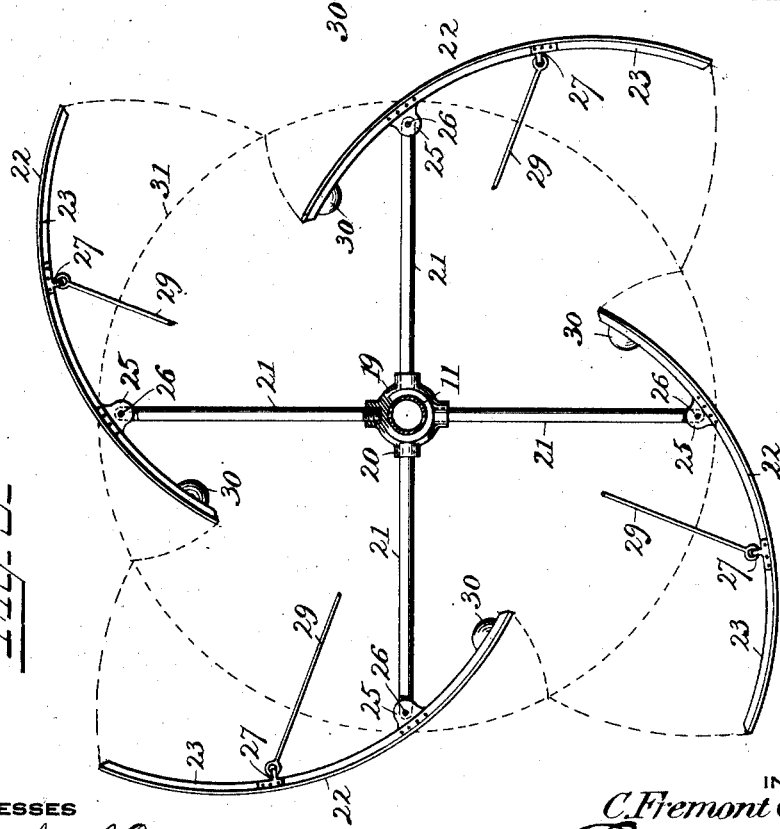
WITNESSES
INVENTOR
C. Fremont Currey
BY
ATTORNEY

UNITED STATES PATENT OFFICE.

CHARLES FREMONT CURREY, OF TOPEKA, KANSAS.

WINDMILL.

1,341,045.  Specification of Letters Patent.  Patented May 25, 1920.

Application filed May 16, 1919. Serial No. 297,629.

*To all whom it may concern:*

Be it known that I, CHARLES FREMONT CURREY, a citizen of the United States, residing at Topeka, in the county of Shawnee and State of Kansas, have invented a new and useful Windmill, of which the following is a specification.

This invention has reference to windmills, and its object is to provide a windmill in which the vanes or blades are upright so that the rotor of the windmill turns about an upright axis and the vanes or blades are so constructed as to give maximum power from a given wind velocity.

By extending the blades in the direction of the axis of rotation it is practicable to provide the rotor or wheel of the windmill with a very large area of effective surface without the necessity of extending such surface to inordinate distances from the support and so avoid insecure constructions liable to collapse in heavy winds. Moreover, no guiding devices responsive to change in direction of the wind are needed since the upright wheel will always have some portion of it in the path of the wind and shifting of the wind does not demand a corresponding shift in the windmill structure.

The rotor of the windmill may define a cylinder and may be conveniently divided into four segments, each pivoted to move about an axis eccentric to the axis of rotation of the wheel as a whole so that each blade has one upright edge movable toward and from the axis of rotation to a greater extent than the opposite upright edge, whereby the assemblage of blades may be closed up into a cylindrical contour, or spread out at one edge to include a greater area to provide pockets into which the flowing air may pass and thereby tend to propel the rotor. Each blade has therefore a movement orbital to the axis of rotation and a movement individual to the blade about an axis eccentric to the orbital axis.

Provision is made for yieldingly restraining the spread of the blades whereby the rotor will automatically adjust itself to wind pressure, thus keeping the blades spread in light winds and causing the blades to approach in heavy winds, whereby liability of injury to the windmill is taken care of without the necessity of the presence of an attendant.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a perspective view of a windmill constructed in accordance with the invention.

Fig. 2 is a vertical section, with parts in elevation, and drawn on a larger scale than Fig. 1.

Fig. 3 is a plan view of the windmill, with some parts shown in horizontal section.

Fig. 4 is a perspective view of one of the blades or vanes.

Referring to the drawings, there is shown a base plate 1 which may be in the form of a casting, as indicated, or may be in other appropriate form, and this base plate may be mounted on a foundation 2 which, in practice, is usually a concrete or other solid structure. The base plate 1 is formed with a yoke 3 provided with a journal bearing 4, which journal bearing is traversed by a transmission shaft 5 carrying at one end a bevel pinion 6. The base plate is also provided with a step bearing 7 for an upright shaft 8 carrying a bevel gear wheel 9 located within the yoke 3 and engaging the pinion 6. The step bearing may also include antifriction devices 10 of any suitable character.

The shaft 8 carries or may form part of another upright shaft 11 shown in the drawings, though not necessarily constructed as a hollow shaft and of suitable length to rise to a desirable height. At the upper end of the shaft 11 is a cap 12 between which and the shaft 11 antifriction devices 13 may be interposed. Fast to the cap 12 are a suitable number of guys 14.

At a suitable point near the top of the shaft 11 there is secured a set collar 15 and at a point lower down on the shaft 11 is another set collar 16. Between the set collars the shaft 11 is surrounded by a sleeve 17 between which and the set collar 15 there is lodged a compression spring 18.

Mounted upon the shaft 11 are hubs 19, one of which is shown in Fig. 2, and these hubs are fixed on the shaft. Secured at the inner ends to each hub 19, which is provided with radial bosses 20 for the purpose, are an equal number of radial arms 21, these arms being indicated as four in number, although a greater number may be provided if occasion demands. There are also provided four segmental blades or vanes 22 constituting like segments of a cylinder, usually four blades 22 are sufficient, but in large windmills a greater number may be found desirable, in which case a corresponding number of arms 21 are employed. The blades 22 may each be made of sheet metal, a single sheet answering for small windmills, while a number of sheets riveted or otherwise secured together to produce sufficient area may be employed for larger windmills. Each blade is provided near the upper and lower edges with a strip 23 or 24, as the case may be, of angle steel or the like, suitably riveted or otherwise made fast to the inner or concave face of the curved blade. The strips 23 and 24 not only serve to strengthen and stiffen the blades but also provide means for the attachment to each blade of pairs of ears 25, one to the strip 23 and the other to the strip 24. These ears are designed to receive the outer ends of the arms 21 which are shaped to enter between each pair of ears and the arms and ears are held together by pivots 26 or in other appropriate manner. Since each blade 22 may be longer than wide and to stiffen the structure it is advisable to provide a sufficient number of hubs 19, one above the other and appropriately spaced apart, and each hub 19 carries a set of arms 21 individual thereto and connected at the outer ends to a respective one of the strips 23 and 24. The strip 23 has an eye 27 fast to it in spaced relation to the adjacent ear 25. Extending from each eye 27 to a correspond eye 28 on the sleeve 17 is a link 29. The links 29 are each connected at one end to an eye 27 and at the other or upper end to an eye 28, these links being ordinarily disposed at an angle of about 45° to the vertical. On each blade 22 there is secured a counterweight 30 on that side of the pivot 26 remote from the eye 27.

In the position of the parts when either no wind is blowing or but a light wind, the blades have the relation to each other similar to that of Fig. 3 and other parts have the position shown in Fig. 2. The sleeve 17 is supported by the collar 16 and the blades 22 are each mounted to rock upon an upright axis to one side of the longitudinal center line of the blade with the link connection located on the other side of the longitudinal center line of the blade and the axis of rocking of the blade being radially displaced from or eccentric to the orbital axis of the group of blades. The counterweight 30 is located on that side of the pivot 26 remote from the connection of the link 29 with the blade. The length and disposition of each link 29 is such that the blades are in the open position, that is, the weighted ends of the blades approach the axis of the wheel as a whole and the longer ends of the blades measured from each pivot 26 are spaced away from the axis of rotation to a greater extent than the closed position of the blades. Such closed position is indicated by the dotted circle 31 in Fig. 3 and in such case the blades are in edge to edge relation.

Since the normal position of the rotor of the windmill is the open position, such as indicated in Figs. 1 and 3, the concave side or face of some one or more of the blades is presented to windward and the rotative effect of the wind thereupon is counteracted only by the convex side of others of the blades so that the total effect is to set up rotation of the rotor of the windmill. This effect occurs no matter from what direction the wind is blowing and no shifting of the rotor is necessary.

Should the wind become strong and the rate of rotation therefore increased, the centrifugal effect of the weights 30 causes the shorter side of the blades to move away from the axis of rotation, thereby tending to close the several blades into the circular or cylindrical position, and this tendency causes the approach of the lower ends of the links 29 toward the axis of rotation, thus changing the angle of these links into a more acute relation to the axis of rotation. This tendency is resisted by the spring 18 and when the approaching tendency of the links is great enough the spring 18 yields and the blades close together. If the wind is very strong the blades may be caused to approach quite closely together, thereby cutting down the efficiency of the rotor of the windmill until the parts are in balance. This means that increasing wind pressure is met by a lessening of the surface exposed to the wind and the parts are brought to a state of equilibrium, avoiding either excessive speeds or excessive strains so that the windmill automatically adjusts itself to varying conditions.

What is claimed is:—

1. A windmill comprising a circular series of blades, each constituting a segment of the same cylinder to close into cylindrical form with the segments in edge to edge relation, said blades when assembled having a common upright axis of rotation and each blade being mounted to rock on an upright axis individual to it and eccentric to the axis of rotation of the assemblage of blades, means individual to the blades for imparting thereto a tendency to close into cylindrical form when rotating, and means common to all the blades and separate from the first-named means for imparting to the blades a normal tendency to open.

2. A windmill comprising a circular series of segments closable to define a cylinder with the segments edge to edge, said segments having concave inner faces and convex outer faces, a support for the segments to which they are attached and about the longitudinal axis of which the series of segments is rotatable, with each segment having an upright axis of rocking individual thereto and eccentric to the first-named axis, means individual to the segments and having a tendency to close the series of segments into cylindrical form when the windmill is in operation, and means other than the first-named means and having a constant tendency to rock the segments about their individual axes into open relation to each other.

3. A windmill provided with a rotor mounted to turn about an upright axis and having blades or vanes each mounted to turn orbitally about the axis of the rotor as a whole and individually about an upright axis to one side of the upright longitudinal center line of the blade, centrifugally acting means individual to the blades for causing them to approach, and yieldable means acting through the blades and other than and separate from the centrifugal means for resisting the action of the latter.

4. A windmill comprising a series of blades each constituting a segment of the same cylinder and together mounted to rotate about an upright axis, said blades being elongated in the same direction as the axis, arms radiating from the axis of rotation and supporting the blades outwardly therefrom, said arms being connected to respective blades to one side of the upright center line of the blades, with said blades pivoted to the arms to each turn about an axis individual to the blades and eccentric to the axis of rotation of the blades as a whole, centrifugal means individual to and controlling the movement of each blade about its individual axis toward the closed position of the windmill, and yieldably resistent means other than and separate from the centrifugal means for opposing the closing movement of the blades of the windmill.

5. A windmill comprising an upright rotatable member, a series of upright blades carried by the rotatable member and each constituting a segment of a cylinder, carrying devices for the blades extending outwardly from the rotatable member and each at its outer end being pivotally connected to a respective rotatable member to one side of the longitudinal center line thereof for the rocking of the blade on an upright axis eccentric and parallel to the axis of rotation of the rotatable member, centrifugally responsive means on the blade on the short side thereof, and a compression spring device and connections therebetween and the blades, whereby rotative movement of the windmill imparts thereto a tendency to close and the compression spring device is resistent to such tendency.

6. A windmill structure comprising an upright rotatable shaft, arms carried by and projecting from the shaft, blades in the form of cylinder segments carried by the outer ends of the arms and pivoted thereto to each rock on an upright axis eccentric to the axis of rotation of the shaft, said axis of rotation being to one side of the upright center lines of the blades, counterweights on the shorter sides of the blades, links connected to the longer sides of the blades, a sleeve slidable along the shaft and connected to the links, and a spring on the shaft resistent to the sliding movements of the sleeve in a direction away from the blades.

7. A windmill comprising an upright rotatable shaft or support, with bearings at opposite ends, guys extending from the upper bearing, spaced hubs on the shaft, a sleeve on the shaft higher than the hubs, spaced set collars on the shaft on opposite sides of the sleeve, a spring on the shaft between the sleeve and the upper set collar, arms extending outwardly from the hubs, curved plates constituting vanes and each curved plate forming a segment of a cylinder, said plates being carried by the outer ends of the arms and rockable on an axis parallel with and eccentric to the axis of the shaft with the axis of rocking of the plate located at one side of the longitudinal center line thereof, links extending from the sleeve to the plates each on the opposite side of the center line thereof from the connection of the arms to said plates, and a counterweight on each plate on the side of the axis of rocking of the plate remote from the longitudinal center line thereof.

8. A windmill structure comprising a rotatable series of upright curved blades each constituting a segment of a cylinder, said blades being pivotally supported to rock on an upright axis individual to the blade nearer to one side thereof than the other and in spaced relation to the axis of rotation of the series of blades and each blade having a counterweight on the shorter side thereof, the counterweight being on that side of the axis of rocking of the blade remote from the concave portion of the blade engaged by the wind.

9. A windmill provided with a rotor having a circular series of bent plates constituting blades, with each plate having an individual upright axis of rocking in spaced relation to the axis of rotation of the rotor and located to one side of the longitudinal center line of the blade, each of said blades having a counterweight on the side of the axis of rocking remote from the longitudinal center line, and means connected to the blade on the other side of said center line and having a constant tendency to move the corresponding edge of the blade away from the axis of rotation of the rotor.

In testimony that I claim the foregoing as my own, I have hereto affixed my signature.

CHARLES FREMONT CURREY.

Witnesses:
A. J. WHITMORE,
GEO. BURGHART.